UNITED STATES PATENT OFFICE.

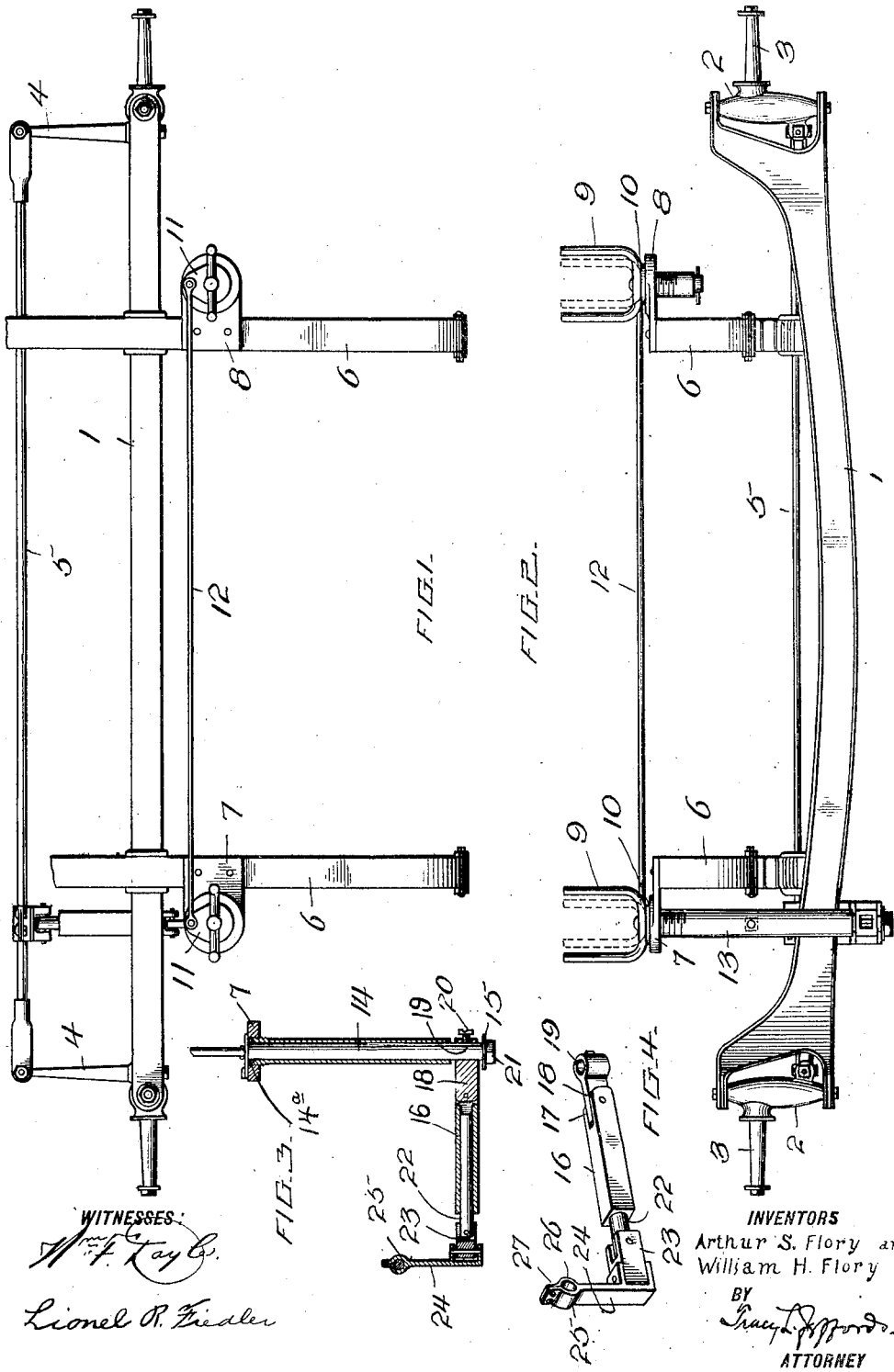

ARTHUR S. FLORY AND WILLIAM H. FLORY, OF FAIR HAVEN, VERMONT.

AUTOMOBILE-HEADLIGHT.

1,099,920.  Specification of Letters Patent.  Patented June 16, 1914.

Application filed August 26, 1913. Serial No. 786,803.

*To all whom it may concern:*

Be it known that we, ARTHUR S. FLORY and WILLIAM H. FLORY, citizens of the United States, residing at Fair Haven, in the county of Rutland, State of Vermont, have invented certain new and useful Improvements in Automobile-Headlights; of which the following is a description, reference being had to the accompanying drawings, forming a part hereof.

Our invention relates to a new and useful improvement in automobile headlights and more particularly to that class of headlights that move or turn in a direction with that of the wheels of the automobile.

An object of our invention is to provide a device of the character described that may be easily and readily attached to any make of automobile.

Another object is to provide a device of the character described that will be strong and effective in service and so constructed that the parts will not be readily affected by the jar and jolt that an automobile is subjected to.

Another object is to provide a device that will be cheap to construct, easy to manufacture and readily assembled and easy to attach.

With these and other objects in view our invention consists in certain new and novel constructions and combinations of parts as will be hereinafter more fully described and pointed out in the claims.

Similar letters of reference designate corresponding parts throughout the several views.

In the drawing Figure 1 is a top plan view showing a part of an automobile with our device attached. Fig. 2 is a front view in elevation. Fig. 3 is a sectional view of a sliding connection; and, Fig. 4 is a view in elevation of the same.

Referring now to the drawing 1 is an axle of any common type and shown with enlarged and forked ends. It is to be understood that the kind of axle forms no part of our invention. Secured in the arms of the ends of the axle are the steering knuckles 2 which are provided of course with a stub axle 3 to which are fastened the wheels of the automobile. Secured to the lower end of these steering knuckles 2 are the rods or short arms 4, to the ends of which is secured the rod 5, which is the usual form of construction in automobiles. To this rod 5 is secured a shaft and steering wheel, the same not being shown in the drawing as this also forms no part of my invention.

On the surface of the frame 6 are secured two plates 7 and 8 adapted to hold the lamp brackets 9. These brackets are secured to a plate 10, which are shown as elongated at 11 and pivoted to these plates is the rod 12 so arranged that any movement of the rod 12 will be transferred to the brackets 9, and of course move them in the same direction. To the plate 7 is secured a hollow post 13 extending downwardly for a short distance below the axle 1 and passing through this hollow post is a rod 14 which is rigidly secured at its upper end to the lamp bracket 9. This rod 14 is screw-threaded at its lower end as at 15. It will be seen that this rod 14 extends a short distance below the hollow post 14 and is adapted to be connected to a hollow arm 16 that is provided with a bifurcated end 17 to which is pivoted a knuckle 18 provided with the opening 19 which is adapted to fit around the lower end of the post 14 and is locked into position by the set screw 20, a nut and washer 21 are also placed at the lower end of the rod 14. A rod 22 is provided which is adapted to slidingly fit within the arm 16 and is pivoted to a bifurcated clamp 23 which is pivoted to an arm 24 and the upper end of the arm being enlarged as at 25 and forming the opening 26 and clamped by screws 27 to the rod 5. The object in having this sliding connection and the pivoted joint is so that when the bar 5 moves in a lateral direction the rod 22 may slide within the arm 16 so that the rod 5 will not be in any way shortened or hindered in its movement, which is the case where a solid or unbroken connection is made between the lamps and the steering rod, and the numerous pivoted joints allow for any jolts or jars which the cars may be subjected to. It will be seen that when the steering rod 5 is moved by the steering wheel and rod, not shown, the direction transmitted to the wheels will also be transmitted through the arm 24, arm 16 and post 14 to the brackets 9, and in the same direction.

From the foregoing it will be seen that our invention consists of but few parts, that the brackets and plates may be readily secured to the frame of any automobile and that the rod 12 may be readily secured to the brackets and the connection between the brackets and the steering rod may be quickly secured to both members mentioned and at the same time will withstand a great amount of jar, and the movement of the steering rod 5 will be in no way hampered.

The rod 14 is provided with ball bearings as shown at 14ª.

Having thus described our invention what we desire to secure by Letters Patent is:

1. In a device of the character described the combination with plates adapted to be secured to the frame of an automobile having a steering rod, of brackets supported by said plates, a rod pivoted to and connecting said brackets, a hollow post secured to one of said plates, a rod secured to one of the brackets arranged within the hollow post and extending below its lower end and adapted to rotate and to be vertically movable in said hollow post, a hollow arm secured at one end to the rod below the lower end of the hollow post, a rod fitting within the hollow arm and adapted to slide longitudinally thereof and a crank arm connected at one end to said rod and at its other end, adapted to be secured to the steering rod.

2. A device of the character described the combination of plates adapted to be secured to the frame of an automobile having a steering rod, brackets supported by said plates, a rod pivoted to and connecting said brackets, a hollow post secured to one of said plates, a rod secured to one of the brackets arranged within the hollow post and extending below its lower end and adapted to rotate and to be vertically movable in said hollow post, a hollow arm secured at one end of the rod below the lower end of the hollow post, a rod fitted within the hollow arm and adapted to slide longitudinally thereof and a crank arm connected at one end to said rod and at its other end provided with a clamp for securing it to the securing rod.

This specification signed and witnessed this 14th day of April A. D. 1913.

ARTHUR S. FLORY.
WILLIAM H. FLORY.

In the presence of—
PAUL J. LURA,
PHILIP M. M. PHELPS.